United States Patent

[11] 3,629,043

| [72] | Inventor | Charles Nicholas Hoff<br>Willowdale, Ontario, Canada |
|---|---|---|
| [21] | Appl. No. | 787,831 |
| [22] | Filed | Dec. 30, 1968 |
| [45] | Patented | Dec. 21, 1971 |
| [73] | Assignee | General Binding Corporation (Canada) Limited |

[54] PAPER-BINDING APPARATUS
9 Claims, 4 Drawing Figs.

[52] U.S. Cl. .................................................... 156/358
[51] Int. Cl. .................................................... B41f 13/64
[50] Field of Search ........................................ 156/353–368, 515, 558, 580–583, 477 B; 270/11, 5

[56] References Cited
UNITED STATES PATENTS

| 3,146,473 | 9/1964 | Hoff | 270/11 |
| 1,864,766 | 6/1932 | Schmidt | 156/477 B |
| 2,646,104 | 7/1953 | Hawkes | 156/477 B |
| 2,697,236 | 12/1954 | McCain et al. | 156/477 B |
| 2,824,541 | 2/1958 | Paulsen | 156/477 B |
| 3,054,715 | 9/1962 | White | 156/233 |
| 3,089,534 | 5/1963 | Schuler et al. | 156/364 |
| 3,166,463 | 1/1965 | Klostermann | 156/477 |
| 3,364,092 | 1/1968 | Hawkes et al. | 156/354 |

Primary Examiner—Benjamin A. Borchelt
Assistant Examiner—Daniel Bent
Attorney—Geo. A. Rolston ABSTRACT: An apparatus for bonding a stack of papers into pads having a frame, a holder with spaced apart plates to receive the stack of papers therebetween, conveyor means on the frame for supporting the holder and advancing the holder at a constant speed along a predetermined path between a loading station and a discharge station of the path through the following stations, a jogger station for aligning the bottom edges of the stack of papers at the loading station, a tape-applying station for applying a length of tape in contact with the aligned bottom edges of the stack of papers, heat and pressure station to heat the tape and bind the bottom edges of the stack of papers to the tape, and means for bonding portions of the tape to the adjacent outer surfaces of the stack of papers to form the pad which is discharged at the discharge station.

INVENTOR
CHARLES N. HOFF

BY: *George A. Rolston*
PATENT AGENT

PATENTED DEC 21 1971

INVENTOR
CHARLES N. HOFF

BY: *George A. Rolston*
PATENT AGENT

PAPER-BINDING APPARATUS

This invention relates to a paper-binding apparatus and more particularly to an automatic apparatus suited for the binding of papers and booklets for resale or for heavy use.

The prior art binding machines provide a good adhesive bond between the edges of a stack of sheets of paper by bonding a layer of adhesive-bonding material along the exposed edges where the same are stacked together and held tightly in position. Such edge bonding is adequate for light usage such as is found in offices and in the binding of so called "dead" files and correspondence. However, when it is desired to bond paper for resale as booklets or for continuous heavy wear, it is often found that a mere bonding along the edges of the paper in a stack is insufficient to secure adequate adhesion and sheets become loosened.

This problem can be overcome by providing a novel thermoplastic tape adjacent the edges of the sheets to be bound thereby establishing a bonding zone with the edges and heating the thermoplastic tape and applying a pressure to the sheets so that a bonding zone extending up the sheets from the edge of the sheets is provided. Thus bonding between the marginal positions of the opposed faces of each sheets in a stack is provided instead of merely along their exposed edges. The heating of the thermoplastic tape and then applying pressure to the set of sheets proves to be satisfactory whereas prior apparatus has not proven satisfactory as the individual sheets of paper are clamped too tightly together thereby preventing the application of adhesive along such marginal portions.

According to this invention there is provided an automatic paper-binding apparatus where a stack of papers are manually inserted in a holder and the papers are edge aligned by jogging means, then the papers are moved automatically to the next stage where a thermoplastic material is applied to the bottom edges of the papers, then the tape is passed over a heat-applying means where the edges of the papers are bonded to the thermoplastic material and then the papers are passed through a side pressure roller means to bond the excess thermoplastic tape on opposite outer surfaces of each stack to give a roll edge stripped effect.

Accordingly it is an object of the present invention to provide apparatus for automatically binding sheet material which is arranged in a manner facilitating the application of thermoplastic tape to the bottom edge thereof.

More particularly it is an object of the present invention to provide apparatus having the foregoing advantages which is provided with heating means for setting the thermoplastic tape material.

A preferred embodiment of the invention will now be described by way of example only with reference to the following drawings in which like reference devices refer to like parts thereof throughout the various views and diagrams and in which.

Figure 1:
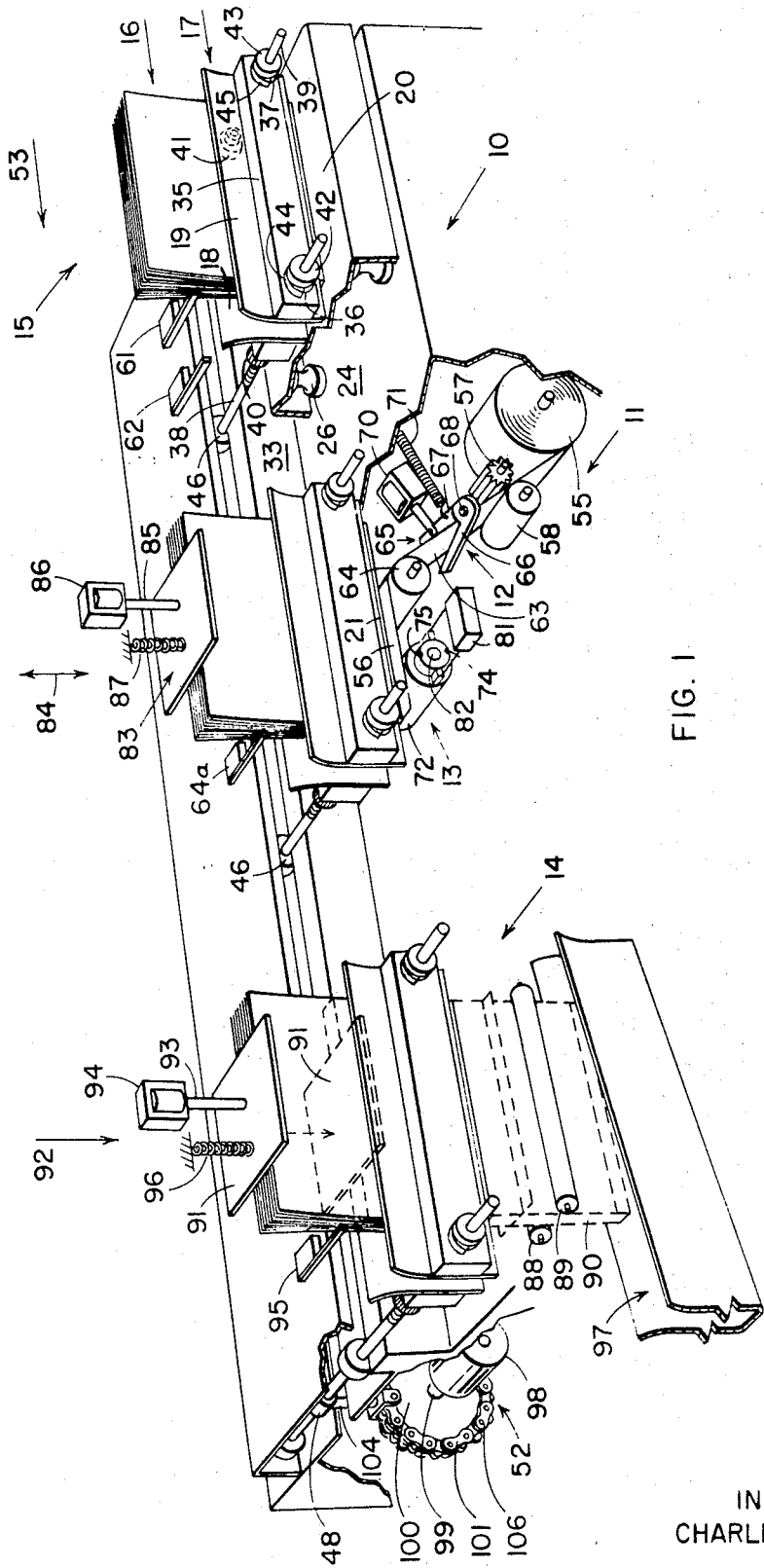
FIG. 1 is a perspective illustration of a schematic binding machine according to the present invention.

Referring now to the accompanying drawings in detail, FIG. 1 illustrates a paper-binding apparatus which comprises schematically a jogger apparatus designated generally by the reference number 10, a tape-applying means 11, a cutter means 12, a heat and pressure-applying means 13 and a side pressure roller means 14. The paper-binding apparatus has a loading station 15 where a user manually loads a stack of loose papers 16 into a trough-shaped holder 17 and then the holder 17 is moved continuously through a number of stations by an automatic drive mechanism. During the continuous advancing of the holder 17 and papers 16 through the apparatus (1) the stack of papers 16 are bottom edge aligned; (2) the bottom edge is put in contact with a tape having a width greater than the thickness of the stack of papers 16 and a length equal to the length of the stack of papers; (3) the tape is then heated to a molten liquid form and becomes bonded between the marginal portions of the opposite faces of each sheet in the stack of papers 16; (4) the excess amount of tape on each side of the stack of papers 16 is then bonded to the adjacent outer surfaces of each stack of paper 16 giving a roll edge stripped effect. Preferably the paper-binding apparatus is tilted slightly downwards from the loading station 15 to the discharge end to permit gravity to assist advancing the holder 17 and the stack of papers 16 through the stations. Three holders 17, all identical, are shown in FIG. 1 at different stations of the apparatus. The holders 17 are moved automatically through the station of the apparatus as will be described later.

The trough-shaped holder 17 has parallel spaced apart vertical plates 18 and 19 which are positioned to be 1/8 of an inch above a first horizontal plate 20 of the jogger apparatus 10. When the stack of papers 16 are inserted between the plates 18 and 19 bottom edges 21 of each individual sheet are in contact with the horizontal plate 20.

Figure 2:
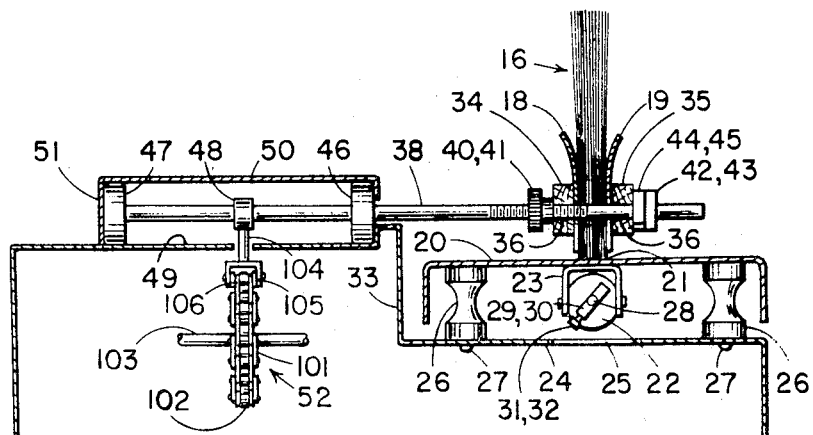
FIG. 2 is an enlarged plan view of the jogger apparatus and the apparatus for automatically moving the stack of papers through the stages shown in FIG. 1.
Figure 3:
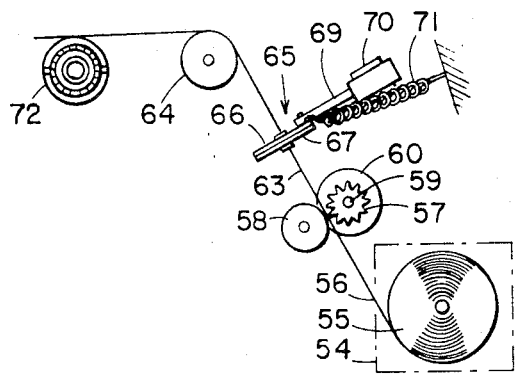
FIG. 3 is a side view of the tape-applying means of the apparatus shown in FIG. 1.
Figure 4:
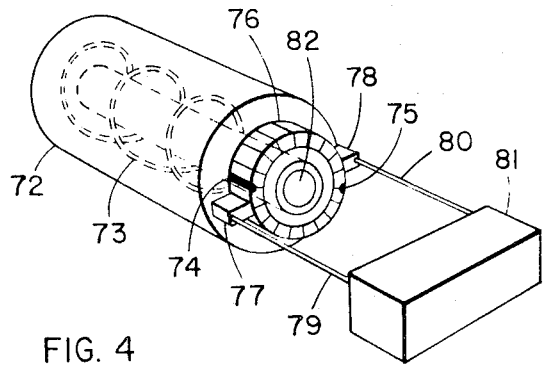
FIG. 4 is an enlarged perspective illustration of the heat-applying means of the apparatus shown in FIG. 1.

As shown best in FIG. 2, the jogger apparatus 10 comprises a jogger motor 22 connected to the undersurface of the first horizontal plate 20 by a bracket 23, a second horizontal plate 24 with a central hole 25 therethrough which is positioned beneath the first plate 20 and parallel thereto, four pillars 26 formed of soft rubber material and preferably shaped like dumbbells connected between the plates 20 and 24. The central hole 25 in the second plate 24 permits the motor 22 to extend below the second plate 24 if necessary. Each pillar 26 has one end adhesively bonded to the first plate 20 and the other end is attached to a second plate 24 by means of bolts 27. The motor 22 has an output shaft 28 extending out both ends (only one end is shown) with two weights 29 and 30 connected on either end of the shaft 28. The weights 29 and 30 are movably fastened to the shaft 28 by means of screws 31 and 32 respectively which permits the weights 29 and 30 to be rotated to various orientations about the shaft 28 to produce the desired jogger action. The second plate 24 is securely fixed to a vertical plate 33 and the first plate 20 is free to make limited movement in any desired direction relative to the second plate 24. The principle on which the jogger 10 operates is generally similar to that set out in U.S. Pat. No. 3,240,492 issued on Mar. 15, 1966 to the inventor W. C. Hoff. The stack of papers 16 inserted in the holder 17 are bottom edge aligned by the jogger apparatus 10 and the side edges of the stack of papers 16 are easily aligned by hand by the user at the same time.

The holder 17 comprises the vertical plates 18 and 19 having a pair of support bars 34 and 35 attached to the lower portions of the outer surfaces of each of the vertical plates 18 and 19 respectively. The bars 34 and 35 preferably are rectangular in cross section and have a length longer than the length of the stack of papers 16. At each end of the bars 34 and 35 are transverse holes 36 and 37 to receive rods 38 and 39 therethrough. The rods 38 and 39 extend substantially perpendicular to the path of travel of the holder 17 and the stack of papers 16 therein. The rods 38 and 39 have a threaded intermediate portion on which are axially positioned two collars 40 and 41 adjacent the bar 34. The collars 40 and 41 hold the bar 34 and the vertical plate 18 in position between the rods 38 and 39. Axially positioned on and near the free ends of the rods 38 and 39 are pinch lock collars 42 and 43. The collars 42 and 43 are attached to the bar 35 and the vertical plate 19 to form one unit. The collars 42 and 43 permit the vertical plate 19 to be moved towards and away from the vertical plate 18 as necessary to receive different thicknesses of the stack of papers 16. Pinch locks 44 and 45 on collars 42 and 43 respectively permit the user to lock the vertical plate 19 on the rods 38 and 39 to secure the stack of papers 16 between the plates 18 and 19. Once the stack of papers 16 are bottom and side edge aligned the vertical plate 19 is moved towards the vertical plate 18 to hold the stack of papers 16 securely between the plates 18 and 19 and the pinch locks 44 and 45 are secured to prevent the vertical plate 19 from moving away from the plate 18. On the other end of the rods 38 and 39 are axially positioned rotatable rollers 46 and 47 attached to each of the bars 38 and 39 on suitably bearings (not shown) to permit the holder 17 to be moved automatically through the different stations of the apparatus. Between the rollers 46 and 47 secured to the bar is a connecting means 48 which extends through a longitudinal slot in a bottom wall 49. The bottom wall 49 and a top wall 50 connected at one end by an end wall 51 form a channel which extends the length of the paper-binding apparatus for the rollers 46 and 47 to travel therein. The connecting means 48 is connected to an electrically driven chain and sprocket mechanism 52 which moves the holder 17 and the stack of papers 16 automatically through the different stations of the apparatus in a direction shown by an arrow 53 (in FIG. 1) as will be described later.

The tape application apparatus 11 comprises a tape reservoir 54 wherein a roll of tape 55 is axially rotated to present a sticky surface 56 to make contact with a sharp tooth gear 57 as the tape 55 is passed between the gear 57 and a roller 58. The gear 57 is axially connected to an output shaft 59 of an electric motor 60. Preferably the motor 60 is an instant stop and go motor available commercially on the market and well known in the art and therefore is not described herein. The motor 60 is electrically connected to microswitches 61 and 62 to stop and start the motor. The microswitches 61 and 62 are registered approximately the length of the stack of papers 16 apart and are engaged by the moving stack of papers 16 or the holder 17 when advancing from the loading station 15 towards the tape-applying means 11. As the tape 55 is fed upwards from between the gear 57 and the roller 58 the tape 55 makes contact with a guide passageway 63 which extends from the roller 58 to a roller 64 positioned so that its outer surface will make contact with the bottom edges 21 of the stack of papers 16. The roller 64 has a width greater than the width of the tape 55 which preferably is wider than the thickness of the stack of papers 16 secured between the vertical plates 18 and 19.

The tape 55 is fed onto the roller 64 in such a manner that the front edge of the stack of papers 16 makes contact with the free end of the tape 55 resting on the roller 64. The gear 57 feeds the tape 55 to the roller 64 while the stack of papers 16 is passing over the roller 64. The tape 55 is cut by the cutting means 12 when the front edge of the stack of papers 16 engages a microswitch 64a which is electrically connected to the cutting means 12. The length of tape 55 is the same as the length of the bottom edges 21 of the stack of papers 16 so that the back edge of the stack of papers 16 is aligned with the end of the tape 55.

The cutting means 12 comprises a solenoid activated pair of scissors 65 with a rigidly fixed bottom blade 66 with its upper surface aligned with the top wall of the passageway 63 and a movable upper cutting blade 67 pivotally connected to the bottom blade 66 by a pin 68 at one end thereof. The upper blade 67 is secured to an extension arm 69 of a solenoid 70. The solenoid 70 is electrically connected to the microswitch 64a and the solenoid 70 is activated when the front edge of the stack of papers 16 makes contact with the microswitch 64a to cut the tape 55. The upper blade 67 is spring biased by a spring 71 to be moved away from the lower blade 66 after the tape is cut.

Adjacent the roller 64 is a heat and pressure-applying means 13 where the bottom edges 21 and the tape 55 are passed over a heated roller 72 which has a width greater than the width of the tape 55. Within the roller 72 is a helically wound wire coil 73 having ends 74 and 75 extending out one side of the roller 72 and the ends 74 and 75 are connected to a conducting collar 76 attached on the side of the roller 72. The collar 76 rotates in the same direction as does the roller 72. Carbon brushes 77 and 78 are in contact with the outer surface of the collar 76 and are electrically connected by wire 79 and 80 respectively to an electrical power source 81. The outer surface of the roller 72 is heated when the power source 81 is turned on to a temperature of between 450° farenheit and 550° farenheit preferably. The outer surface of the roller 72 is aligned to make contact with the tape 55 attached to the bottom edges 21 of the stack of papers 16. The tape 55 is heated for reasons which will be described later. The roller 72 and the collar 76 are rotatably positioned on a secured pin 82 which permits the roller 72 to rotate when the tape 55 and the bottom edges 22 make contact with the outer surface of the roller 72. If desired, the roller 72 may also be spring loaded on the pin 82 to permit a force to be applied against the tape 55 and the bottom edges 21 of the stack of papers 16. Otherwise, additional pressure applying means 83 is positioned directly above the roller 72 at a height sufficient to permit the pressure-applying means 83 to engage the top edges of the stack of papers 16 when the pressure-applying means 83 is moved in a direction downward as shown by an arrow 84 in FIG. 1. An extension arm 85 of a solenoid 86 is attached to the pressure-applying means 83 to move the pressure-applying means 83 downwards as shown by the arrow 84. The solenoid 86 is connected to the microswitch 62 through a time delay switch (not shown) to move the pressure-applying means 83 downwards when the bottom edges 21 meet the tape 55 on the roller 64. The pressure-applying means 83 engages the top edge of the stack of papers 16 while the tape 55 and the bottom edges 21 of the stack of papers 16 are passing over the rollers 64 and 72. The pressure-applying means 83 is spring-biased by a spring 87 to return the pressure-applying means 83 to its normal position away from the top edges of the stack of papers 16.

The holder 17 and the stack of papers 16 are then advanced to the side pressure roller means 14 where the excess amount of tape 55 on each side of the stack of the papers 16 is bonded to the adjacent outer surfaces of each stack of papers 16. The side pressure roller means 14 comprises two longitudinally positioned spaced apart rollers 88 and 89 which have a length greater than the length of the stack of papers 16. Between the rollers 88 and 89 is an opening 90 which is preferably the same width as the width of the stack of papers 16 to permit a second pressure-applying member 91 to push the stack of papers 16 through the space 90 as shown in dotted lines in FIG. 1. The second pressure-applying member 91 is positioned above the top edges of the stack of papers 16 and moves in a direction shown by the arrow 92 in FIG. 1. The member 91 is attached to the end of an extension arm 93 of a solenoid 94. The solenoid 94 is electrically connected to a microswitch 95 which is activated when the front edge of the stack of papers 16 makes contact therewith. The front edge of the stack of papers 16 makes contact with the microswitch 95 when the stack of papers 16 is in position to be released from the holder 17 and pushed between the rollers 88 and 89. The member 91 is spring-biased by a spring 96 to return to its normal position above the top edge of the next stack of papers 16 that the member 91 is to make contact with. As shown in FIG. 1, it is necessary for the user to manually release the pinch locks 44 and 45 on the holder 17 to permit the stack of papers 16 to be pushed down through the plates 18 and 19 and then through the rollers 88 and 89 by the member 91 to a discharge station 97.

The chain and sprocket drive mechanism 52 which moves the holder 17 and the stack of papers 16 from the loading station 15 to the discharge station 97 is powered by a motor 98 with an output shaft 99 having axially positioned thereon a sprocket gear 100. The sprocket gear 100 drives an endless chain 101 that extends around a second sprocket gear 102 rotatably mounted on a shaft 103 at the loading station 15 of the paper-binding apparatus. The connecting means 48 comprises a connecting rod 104 secured perpendicularly to the rod 38 at one end. The rod 104 extends downward through the slot in the wall 49 and is secured to lugs 105 connected to links 106 of the chain 101 at the other end. The connecting means 48 as shown in FIGS. 1 and 2 is permanently fixed to the rod 38 to move the holder 17 through the stations of the apparatus. However, it is possible to have the connecting means 48 releasably attached to the rod 38 to permit the user to remove the holder 17 and rods 38 and 39 from the paper-binding apparatus at the discharge station 97, and return the holder 17 to the loading station 15 where a connecting means 48 can again be attached to the bar 38 to move the holder 17 from the loading station 15 to the discharge station 97 again. The connecting means 48 and connecting rod 104 would travel on the chain 102 underneath the paper-binding apparatus to the loading station 15.

It should be noted that the chain and sprocket drive mechanism 42 is one of many well-known methods of continuously moving the holder 17 and the stack of papers 16 through the different stations of the paper-binding apparatus and it is not intended to limit the invention only to the one method shown.

In operation, the jogger motor 22 is turned on and the solenoids and microswitches are electrically activated. The stack of papers 16 are manually inserted into the holder 17 by a user at the loading station 14. The bottom edges 21 of the papers 16 are in contact with the first horizontal plate 20 and the papers 16 are jogged to be bottom edge aligned. Then the papers 16 can be side edge aligned by the user manually. The vertical plate 19 can then be moved toward the vertical plate 18 to secure the lower portion of the stack of papers 16 therebetween. The pinch locks 44 and 45 are secured by the user to hold the vertical plate 19 in position on the rods 38 and 39. The holder 17 is moved in a direction shown by the arrow 53 from the loading station 15 towards the tape-applying means 11. The chain and sprocket drive mechanism 52 advances the holder 17 automatically and the stack of papers 16 through the different stations of the paper binding apparatus.

The microswitch 61 is engaged by the front edge of the stack of papers 16 and electrically activates the motor 60 to rotate the gear 57 and feed the tape 55 up the passageway 63 towards the roller 64. The tape 55 is fed to the roller 64 to meet the front edge of the bottom edges 21 of the stack of papers 16. The tape 55 with the sticky surface 56 is continuously fed onto the roller 64 to be placed in engagement with the bottom edges 21 of the stack of papers 16 until the microswitch 62 is activated. The electric motor 60 is also shut off by the microswitch 62 and the gear 57 stops feeding the tape 55 along the passageway 63 until the microswitch 61 is activated again and the motor 60 is started again. Also the microswitch 62 activates the solenoid 86 through a time delay switch (not shown). The pressure-applying member 83 is moved downwards by the solenoid 86 to make contact with the top edges of the stack of papers 16 to cause better engagement between the sticky surface 56 of the tape 55 and the bottom edges 21 of the stack of papers 16. When the front edge of the stack of papers 16 makes contact with the microswitch 64a the cutter means 12 is operated and the scissors 65 cut the tape 55. The length of the tape 55 should be the same length as the bottom edges 21 of the stack of papers 16 to permit the cut end of the tape 55 to be aligned with the rear end of the bottom edges 21 of the stack of papers 16. The spring 71 returns the upper blade 67 of the scissors 65 to its normal position after the solenoid 70 has been activated.

The bottom edges 21 of the stack of papers 16 with the sticky surface 56 of the tape 55 attached thereto then passes over the heated roller 72. An electric current is supplied by the power source 81 to the coil 73 in the heated roller 72 and the outer surface of the roller 72 is heated to a temperature of between 450° and 550° farenheit. The pressure-applying member 83 is in contact with the top edge of the stack of papers 16 and the pressure thereon is maintained while any part of the bottom edges 21 of the stack of papers 16 are passing over the heated roller 72. The sticky surface 56 of the tape 55 is preferably a thermoplastic material which when heated changes from a solid to a molten liquid form and provides bonding between the marginal portions of the opposite faces of each sheet in the stack of papers 16. The pressure-applying member 83 forces the bottom edges 21 of the stack of papers 16 into the molten liquid thermoplastic material so that a film of adhesive material is provided along a peripheral margin of each sheet adjacent the bottom edges 21 to be bound. The front edge of the stack of papers 16 makes contact with the microswitch 64a and the cutting means 12 is operated. The pressure-applying means 83 is moved downwards onto the stack of papers 16 and kept there until the rear end of the bottom edges 21 of the stack of papers 16 has passed over the heated roller 72. The solenoid 86 is then deenergized and the spring 87 returns the pressure applying member 83 to its normal position.

The holder 17 and the stack of papers 16 are then moved by the chain and sprocket drive mechanism 52 to the side pressure-applying means 14 where the pinch locks 44 and 45 on the bars 38 and 39 are loosened by the user to permit the stack of papers to be pushed between the plates 18 and 19 and through rollers 88 and 89 to bond the excess amount of tape 55 on each side of the stack of papers 16 to the adjacent outer surfaces of each stack of papers 16 to give a roll edge strip effect.

Preferably, the stack of papers 16 should be positioned over the opening 90 between the rollers 88 and 89 before the pinch locks 44 and 45 are released by the user. Before the microswitch 94 is contacted, the pinch locks 44 and 45 must be released. The microswitch 94 activates the solenoid 94 forcing the pressure-applying means 91 down on the top edge of the stack of papers 16 to force the lower portion of the stack of papers 16 between the rollers 88 and 89. Once the stack of papers 16 has been forced between the rollers 88 and 89 a certain distance the weight of the stack of papers 16 itself will carry the remainder of the stack of paper through the rollers 88 and 89 to the discharge station 97. The pressure-applying means 91 is returned to its normal position by the spring 96. The connecting means 48 can then be disconnected from the rod 38 and the holder 17 and the rods 38 and 39 with the rollers 46 and 47 thereon removed from the paper-binding apparatus and return to the loading station 15 if desired. If the connecting means 48 is secured to the bar 38 then the holder 17 and the rods 38 and 39 will be returned to the loading station 15 under the paper-binding apparatus in the space provided therefore. The end product is a stack of papers 16 where all the separate sheets are attached to the sticky surface 56 of the tape 55 and are securely held therein.

It will thus be seen that the invention has several advantages over prior systems of book binding. Thus, where a front and back cover is to be applied to a book it was standard practice to cut such front and back cover out of a single blank of cover stock and allowing for the thickness of the stack in the dimension of the cover. Obviously, the dimensions were of critical importance since they depended on the stack thickness. In addition, the stack had to be aligned precisely with the median of the cover when bonding.

According to applicant's invention, however, the front and back covers can now be separate sheets the same size as the stack and the adhesive tape is bonded both to the back of the stack and also around the sides of the covers in a wraparound fashion.

The foregoing is a description of a preferred embodiment of the invention only. The invention is not to be taken to be limited to any of the specific features described but comprehends all such variations as come within the spirit and scope of the claims.

What I claim is:

1. An apparatus for bonding a stack of sheet material into pads, comprising, in combination:
   a frame;
   at least one stack holder having first and second spaced apart vertical plates adapted to receive a stack of sheets in substantially vertical position therebetween at a loading station, said plates being movable together and apart for clamping and releasing said stack;
   conveyor means for supporting said holder on said frame while advancing said holder at a constant speed along a predetermined path from one operating station to another located spaced apart along said path;

jogger means provided at a loading station for contacting the bottom edges of said stack and applying a jogging action thereto for forming said stack into substantial bottom edge alignment while said plates are moved apart with said sheets released, said plates being subsequently clamped around said sheets;

an adhesive-tape-applying station for applying a length of precoated adhesive tape in contact with the bottom edges of said clamped stack of sheets as said stack of sheets continue their movement towards the discharge station, edge portions of said tape extending outwardly on either side of said stack;

lower pressure applying means positioned across the path of travel of said tape on said bottom edge of said clamped stack for applying pressure to said tape to bond same to said bottom edges of the stack;

side pressure-applying means positioned across the path of travel of said tape on said bottom edge of said clamped stack for applying pressure to said tape to bond same to said bottom edges of the stack;

side pressure-applying means adjacent said discharge station operable to receive said partially bound stack of sheets when the same are released from said vertical plates and operable to fold said edge portions of said tape around the adjacent outer side surfaces of said stack of papers and applying pressure thereto be bond same in position; and a plurality of electrically operated switching means normally positioned along the path of travel of said holder for actuation thereby and adapted to electrically operate said tape applying means, said lower pressure applying means, and said side pressure-applying means in sequence.

2. An apparatus as claimed in claim 1 including a tape-feeding means adapted to supply said tape to said tape-applying station; and a tape-cutting means associated with said tape-feeding means adapted to cut said tape at the desired length.

3. An apparatus as claimed in claim 1, wherein said conveyor means comprises:

a chain and sprocket driving mechanism for advancing said holders at constant speed along a predetermined path from said loading station to said discharge station of the path.

4. An apparatus as claimed in claim 1, wherein said side pressure-applying means comprises:

a pair of spaced apart rollers positioned adjacent the outer surfaces of said stack, and operable to receive said stack therebetween and apply pressure to said edge portions of said tape.

5. An apparatus as claimed in claim 4, including upper pressure means at said discharge station oriented to engage the top edge of said stack and move said stack downwardly through said pair of rollers.

6. An apparatus as claimed in claim 1, including:

switch means responsive to the presence of the leading edge of the bottom edges of said stack at said lower pressure applying means, and solenoid activated upper pressure means connected to said switch means adapted to engage the top edges of said stack and apply pressure thereto in response to operation of said switch means.

7. An apparatus as claimed in claim 1 including means adapted to receive said bonded pad from said side pressure-applying means at said discharge station.

8. An apparatus as claimed in claim 1, including jogger means at said jogger station comprising:

a support;

a horizontal plate adapted to support the bottom edges of said stack;

means movably mounting said plate on said support;

an electric motor connected to said plate having an output shaft;

two weight members eccentrically attached to opposite ends of said output shaft with their respective centers of gravity offset relative to the axis of said shaft; and adjustable means in at least one of said members for moving its said center of gravity relative to the center of gravity of the other said member.

9. An apparatus as claimed in claim 1, including heating means associated with said lower pressure means and oriented and arranged to heat said tape when said lower pressure means is in engagement therewith.

* * * * *